US008959581B2

(12) United States Patent
Tanizawa

(10) Patent No.: US 8,959,581 B2
(45) Date of Patent: Feb. 17, 2015

(54) SWITCHING APPARATUS, AUTHENTICATION SERVER, AUTHENTICATION SYSTEM, AUTHENTICATION METHOD, AND COMPUTER PROGRAM PRODUCT

(75) Inventor: Yoshimichi Tanizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 945 days.

(21) Appl. No.: 12/547,878

(22) Filed: Aug. 26, 2009

(65) Prior Publication Data

US 2010/0125892 A1 May 20, 2010

(30) Foreign Application Priority Data

Nov. 17, 2008 (JP) .................... 2008-293819

(51) Int. Cl.
*H04L 12/66* (2006.01)
*H04L 9/00* (2006.01)
*H04L 29/06* (2006.01)

(52) U.S. Cl.
CPC ...................... *H04L 63/08* (2013.01)
USPC ................... 726/2; 726/3; 713/155

(58) Field of Classification Search
CPC .. H04L 63/08; H04L 63/0884; H04L 63/0853
USPC ........... 726/2–4; 713/150; 380/255; 455/411
See application file for complete search history.

(56) References Cited

U.S. PATENT DOCUMENTS

| | | | | |
|---|---|---|---|---|
| 6,339,830 | B1 * | 1/2002 | See et al. ........................ | 726/15 |
| 7,035,410 | B1 * | 4/2006 | Aiello et al. ................. | 380/247 |
| 7,631,345 | B2 * | 12/2009 | Noguchi ........................... | 726/2 |
| 7,774,602 | B2 * | 8/2010 | O'Brien et al. ............... | 713/171 |
| 8,549,292 | B2 * | 10/2013 | Kusano et al. ............... | 713/168 |
| 2004/0215957 | A1 * | 10/2004 | Moineau et al. .............. | 713/153 |
| 2005/0160274 | A1 * | 7/2005 | Yukimatsu et al. ........... | 713/182 |
| 2006/0070116 | A1 * | 3/2006 | Park ................................. | 726/3 |
| 2007/0047477 | A1 * | 3/2007 | Zheng ........................... | 370/328 |
| 2008/0104675 | A1 * | 5/2008 | Kusano et al. .................. | 726/4 |
| 2008/0134288 | A1 * | 6/2008 | Halasz et al. .................... | 726/2 |
| 2008/0172724 | A1 * | 7/2008 | Esaka et al. ...................... | 726/5 |
| 2009/0144807 | A1 * | 6/2009 | Zheng ............................... | 726/3 |
| 2009/0238172 | A1 | 9/2009 | Tanizawa et al. | |
| 2009/0287922 | A1 * | 11/2009 | Herwono et al. ............. | 713/155 |

FOREIGN PATENT DOCUMENTS

| | | |
|---|---|---|
| JP | 2005-123878 | 5/2005 |
| JP | 2006067057 | 3/2006 |
| JP | 2006-345205 | 12/2006 |

(Continued)

*Primary Examiner* — Linglan Edwards
(74) *Attorney, Agent, or Firm* — Amin, Turocy & Watson, LLP

(57) ABSTRACT

A switching apparatus includes an authentication client unit that requests user authentication to a user authentication server that performs user authentication of the switching apparatus, and, when the requested user authentication is successfully performed, receives from the user authentication server, information of success of the user authentication and setting information used when terminal authentication of a terminal to be connected to the switching apparatus is relayed to a terminal authentication server that performs terminal authentication; an authentication setting unit that sets the setting information to an authentication relay unit that relays terminal authentication; and a control unit that allows the authentication relay unit to relay the terminal authentication when the setting information is set to the authentication relay unit.

15 Claims, 8 Drawing Sheets

(56) References Cited

FOREIGN PATENT DOCUMENTS

| JP | 2006-352468 | 12/2006 | | |
| JP | 2007-074297 | 3/2007 | | |
| WO | 2008/019615 A1 * | 2/2008 | ................ | H04L 9/32 |

* cited by examiner

FIG.9

```
SIP/2.0 200 OK
Via: SIP/2.0/UDP host.example.com; branch=xxx; received=192.0.0.5
To: bob<sip:bob@example.com>; tag=yyy
From: bob<sip:bob@example.com>; tag=zzz
Call-ID: aaa@host.example.com
CSeq: 1234 REGISTER
Contact: bob@192.0.0.5; expires=7200
IEEE802.1XPrimaryServer: 192.0.0.100        ⎫
IEEE802.1XPrimaryPort: 1812                  |
IEEE802.1XSecondaryServer: 192.0.0.101       |
IEEE802.1XSecondaryPort: 1812                |
IEEE802.1XAccounting: No                     ⎬ a
IEEE802.1XAuthTimer: 3600                    |
IEEE802.1XTerminationAction: Yes             |
IEEE802.1XTerminationActionTimeout: 10       |
IEEE802.1XTerminationActionCount: 2          |
IEEE802.1XSharedSecretEncrypted: XXXXXXXX   ⎭
Content-Length: 0
```

FIG.10

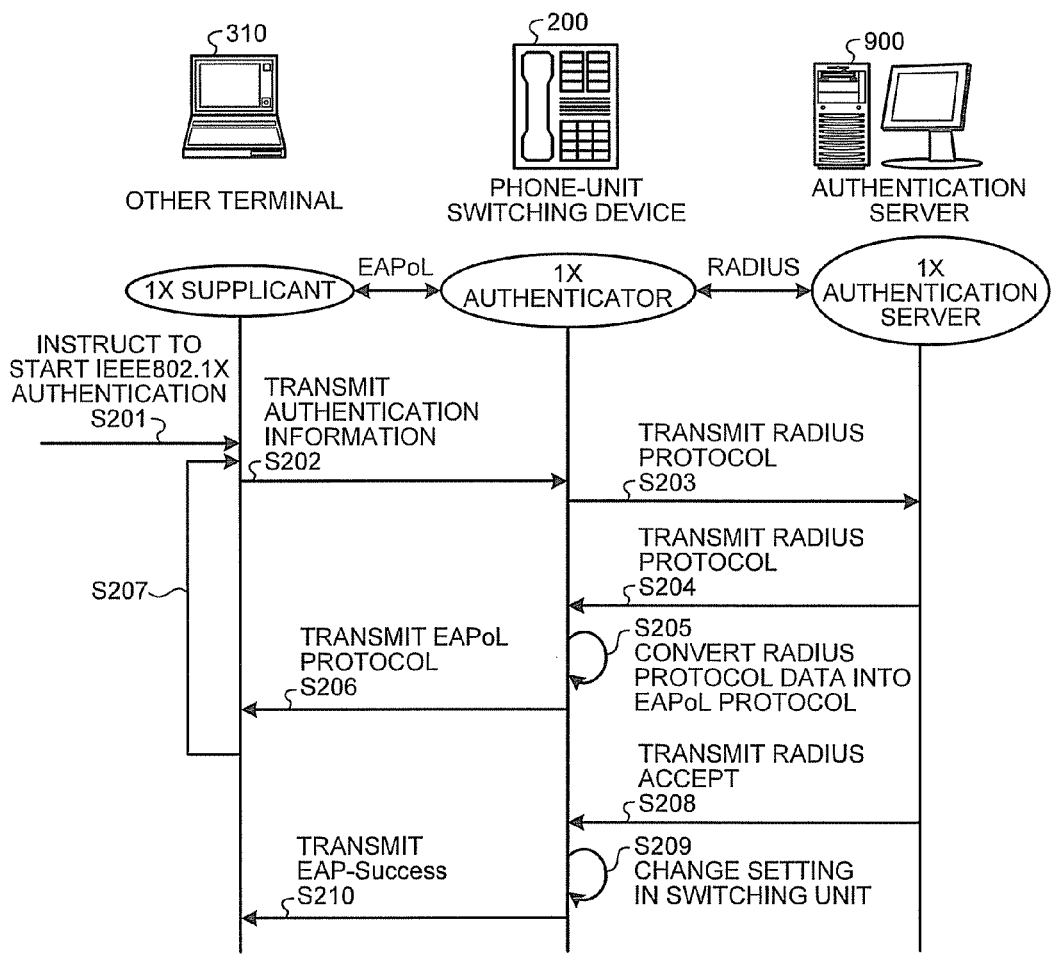

SWITCHING APPARATUS, AUTHENTICATION SERVER, AUTHENTICATION SYSTEM, AUTHENTICATION METHOD, AND COMPUTER PROGRAM PRODUCT

CROSS-REFERENCE TO RELATED APPLICATIONS

This application is based upon and claims the benefit of priority from the prior Japanese Patent Application No. 2008-293819, filed on Nov. 17, 2008; the entire contents of which are incorporated herein by reference.

BACKGROUND OF THE INVENTION

1. Field of the Invention

The present invention relates to a switching apparatus, an authentication server, an authentication system, an authentication method, and a computer program product.

2. Description of the Related Art

In an enterprise network and the like, when a terminal is connected to the network, some authentication may be typically performed to ensure security of the network. For example, IEEE (Institute of Electrical and Electronic Engineers) 802.1X is an access authentication protocol for devices standardized by the IEEE. The IEEE802.1X is defined as a protocol for three parties, i.e., for a Supplicant that is a terminal to be authenticated, an Authenticator that is an authenticating switch, and an Authentication Server that manages authentication information.

For example, JP-A 2006-345205 (KOKAI) and JP-A 2007-74297 (KOKAI) disclose inventions relating to a method of easily setting an IEEE802.1X Supplicant function.

Recently, Authenticator-compliant switches have become increasingly widespread. Accordingly, a method of preparing the Authenticator-compliant switch is becoming a practical option in terms of cost to increase the number of terminals that can be connected to a network. In this case, restrictions on installation of connection terminals imposed by cable routing or the number of ports, or limitations to IEEE802.1X utilization cause no problem.

However, the Authenticator-compliant switch has following problems.

(A) The Authenticator-compliant switch needs to perform setting related to an authentication method, setting on an Authentication Server that exchanges information with the Authenticator-compliant switch at authentication, and the like, to authenticate a Supplicant. Management and operation of these settings of the Authenticator-compliant switch with respect to each user places heavy burdens on an administrator. JP-A 2006-345205 (KOKAI) and JP-A 2007-74297 (KOKAI) do not disclose a method of easily setting the Authenticator function.

(B) Information on the settings of the Authenticator-compliant switch includes "Shared Secret information" (hereinafter, also "SS information"). The SS information is password information for establishing a communication with ensured security between the Authenticator-compliant switch and the Authentication Server. The SS information is critical to ensure security of information to be exchanged with the Authentication Server that holds core information of an enterprise system. Storage of such critical information in the Authenticator-compliant switch, which is allocated to each user, constitutes a large risk in terms of security. For example, when the Authenticator-compliant switch is stolen or physically destroyed to steal the SS information, communication security in the Authentication Server of the enterprise system is not ensured.

SUMMARY OF THE INVENTION

According to one aspect of the present invention, a switching apparatus includes an authentication client unit that requests user authentication to a user authentication server that performs user authentication of the switching apparatus, and, when the requested user authentication is successfully performed, receives from the user authentication server, information of success of the user authentication and setting information used when terminal authentication of a terminal to be connected to the switching apparatus is relayed to a terminal authentication server that performs terminal authentication; an authentication setting unit that sets the setting information to an authentication relay unit that relays terminal authentication; and a control unit that allows the authentication relay unit to relay the terminal authentication when the setting information is set to the authentication relay unit.

According to another aspect of the present invention, an authentication server that performs user authentication of a switching apparatus, the server includes an authenticating unit that receives a request for user authentication, and, when the received request for user authentication is successfully performed, transmits to the switching apparatus, information of success of the user authentication and setting information used when terminal authentication of a terminal to be connected to the switching apparatus is relayed to a terminal authentication server that performs the terminal authentication; and a control unit that generates the setting information and requests the terminal authentication server to set the terminal authentication based on the setting information.

According to still another aspect of the present invention, an authentication system includes a switching apparatus; and a user authentication server that performs user authentication of the switching apparatus and is connected the switching apparatus, wherein the switching apparatus includes an authentication client unit that requests the user authentication server to perform user authentication, and, when the requested user authentication is successfully performed, receives from the user authentication server, information of success of the user authentication and setting information used when terminal authentication of a terminal to be connected to the switching apparatus is relayed to a terminal authentication server that performs the terminal authentication, an authentication setting unit that sets the setting information to an authentication relay unit that relays the terminal authentication, and a control unit that allows the authentication relay unit to relay the terminal authentication when the setting information is set to the authentication relay unit, and the user authentication server includes an authenticating unit that receives a request for user authentication, and, when the received request for user authentication is successfully performed, transmits to the switching apparatus, the information of the success of the user authentication and the setting information, and a control unit that generates the setting information and requests the terminal authentication server to set the terminal authentication based on the setting information.

According to still another aspect of the present invention, an authentication method performed in a switching apparatus, includes requesting user authentication to a user authentication server that performs user authentication of the switching apparatus; receiving, when the requested user authentication is successfully performed, from the user authentication server, information of success of the user authentication and setting information used when terminal authentication of a terminal to be connected to the switching apparatus is relayed to a terminal authentication server that performs terminal authentication; setting the setting information to an authentication relay unit that relays a terminal authentication; and allowing the authentication relay unit to relay the terminal authentication when the setting information is set to the authentication relay unit.

According to still another aspect of the present invention, an authentication method performed in an authentication server that performs user authentication of a switching apparatus, the method includes receiving a request for user authentication; generating, when the received request for user authentication is successfully performed, setting information used when terminal authentication of a terminal to be connected to the switching apparatus is relayed to a terminal authentication server that performs terminal authentication; transmitting, when the user authentication is successfully performed, information of success of the user authentication and the setting information to the switching apparatus; and requesting the terminal authentication server to set the terminal authentication based on the setting information.

According to still another aspect of the present invention, an authentication method performed in an authentication system including a switching apparatus and a user authentication server that performs user authentication of the switching apparatus and is connected the switching apparatus, the method includes requesting by the switching apparatus user authentication to a user authentication server that performs user authentication of the switching apparatus; receiving by the switching apparatus, when the requested user authentication is successfully performed, from the user authentication server, information of success of the user authentication and setting information used when terminal authentication of a terminal to be connected to the switching apparatus is relayed to a terminal authentication server that performs terminal authentication; setting by the switching apparatus the setting information to an authentication relay unit that relays terminal authentication; allowing the authentication relay unit to relay the terminal authentication by the switching apparatus when relay of the terminal authentication is set to the authentication relay unit; receiving the request for user authentication by the user authentication server; generating by the user authentication server, when the received request for user authentication is successfully performed, setting information used when the terminal authentication of the terminal to be connected to the switching apparatus is relayed to the terminal authentication server that performs the terminal authentication; transmitting by the user authentication server, when the user authentication is successfully performed, the information of the success of the user authentication and the setting information to the switching apparatus; and requesting by the user authentication server to the terminal authentication server to set the terminal authentication based on the setting information.

A computer program product according to still another aspect of the present invention causes a computer to perform the method according to the present invention.

BRIEF DESCRIPTION OF THE DRAWINGS

FIG. 9 is a diagram of an example of a successful response message;

FIG. 10 is a sequence diagram of an example of processing of a second authentication;

DETAILED DESCRIPTION OF THE INVENTION

Exemplary embodiments of the present invention will be explained below in detail with reference to the accompanying drawings.

In an embodiment of the present invention, an example is explained in which an Internet protocol (IP) phone-terminal that performs authentication using a Session Initiation Protocol (SIP) for user authentication, and performs authentication using an IEEE802.1X protocol for terminal authentication is used as a switching apparatus.

Implementation of the IEEE802.1X protocol is started when a terminal with a Supplicant function is connected to a physical port of a switch with an Authenticator function via an ethernet cable. To implement the protocol, an Authenticator can exchange an AAA (Authentication, Authorization, Accounting) protocol, for example a RADIUS (Remote Authentication Dial-in User Service) protocol with an Authentication Server.

When it is considered that the authentication is thus performed to connect a device to an enterprise network, it means that an access authentication protocol such as IEEE802.1X is used.

The use of IEEE802.1X causes following problems.

1. Recently, also in offices, one user connects various devices to a network to use the devices. The IEEE802.1X is used to authenticate a Supplicant-compliant device directly connected to a physical port of an Authenticator-compliant switch via Ethernet (registered trademark). Therefore, it may be necessary to route the ethernet cable around in some installations of the Authenticator-compliant switch. In some conditions, a terminal device cannot be connected due to shortage of the physical ports.

2. To address the routing of the ethernet cable or shortage of the physical ports, a hub can be provided to each user, for example, so that each user connects the Supplicant device to the Authenticator-compliant switch through the hub. Normally, according to the IEEE802.1X, one Supplicant device is authenticated with respect to one physical port of the Authenticator-compliant switch.

There is a technique that does not conform to the IEEE standards but enables to connect plural Supplicant devices to one physical port of the Authenticator through a hub. With a configuration according to this technique, however, an additional IEEE802.1X function such as an authentication virtual local area network (VLAN) cannot be used. Accordingly, utilization of the IEEE802.1X is limited.

In the present embodiment, a switching apparatus that is compliant with IEEE802.1X and has no need for consideration of the limitations is explained. The switching apparatus according to the present embodiment can easily manage the SS information required for authentication of a Supplicant when a communication between the Supplicant and an Authentication Server that manages authentication information is relayed. Preferably, the switching apparatus according to the present embodiment further has an IP phone function.

Figure 1:
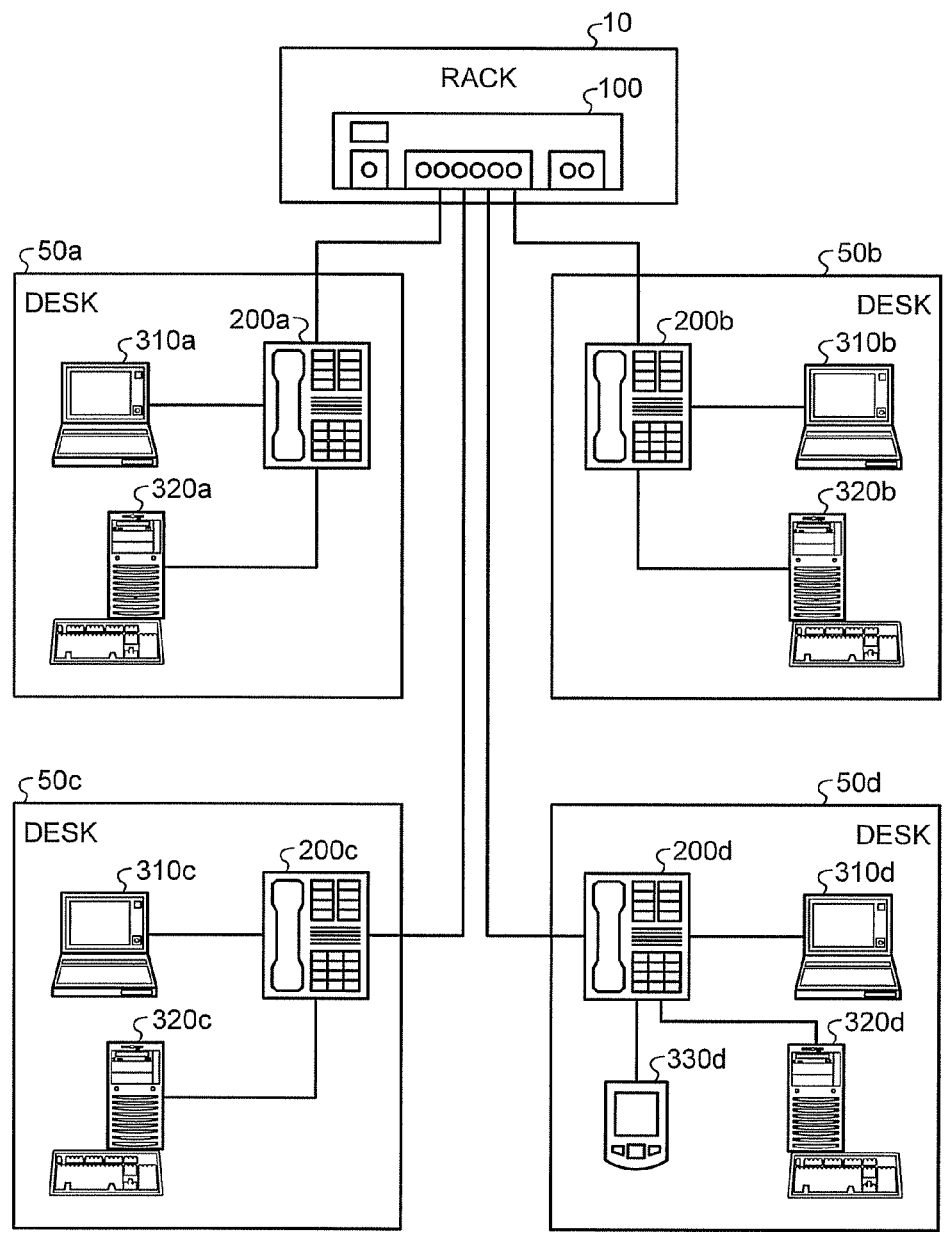
FIG. 1 is a schematic diagram of a configuration of an office in which a switching apparatus is installed.

FIG. 1 is a schematic diagram for explaining an outline of a configuration of an office in which the switching apparatus according to the present embodiment is installed. The configuration shown in FIG. 1 includes a rack 10, and desks 50a to 50d. The rack 10 houses an infrastructure switch 100. The infrastructure switch 100 can have a rooter function.

The desks 50a to 50d have phone-terminal switching apparatuses 200a to 200d, respectively. The phone-terminal switching apparatuses 200a to 200d are connected to terminals 310a to 310d which are personal computers (hereinafter, PC), and can be further connected to terminals 320a to 320d which are PCs, respectively. All the desks 50a to 50d do not need to have the same configuration. For example, the phone-terminal switching apparatus 200d located on the desk 50d can be connected to a mobile terminal 330d.

Figure 2:
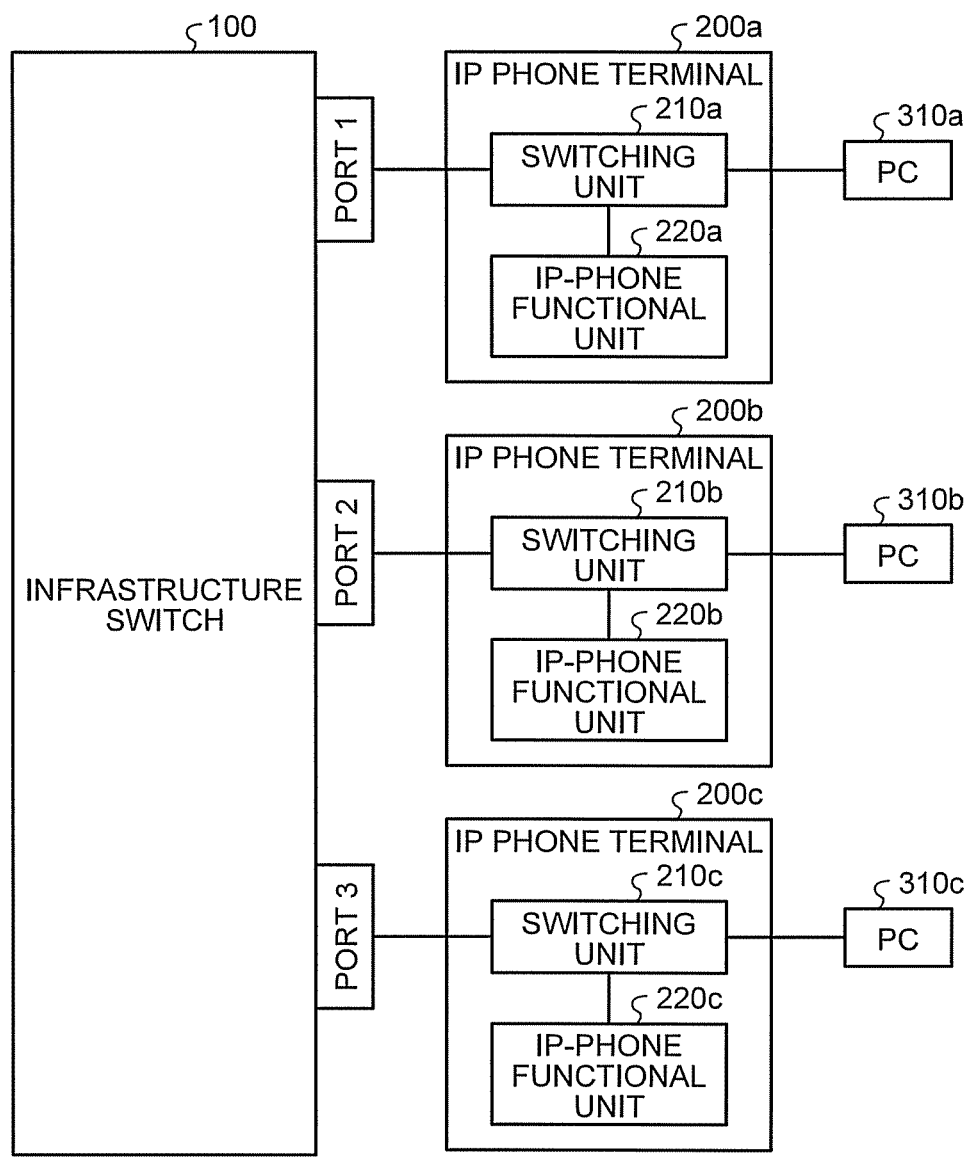
FIG. 2 is a diagram of an example of connection conditions of IP phones for office use.
Figure 3:
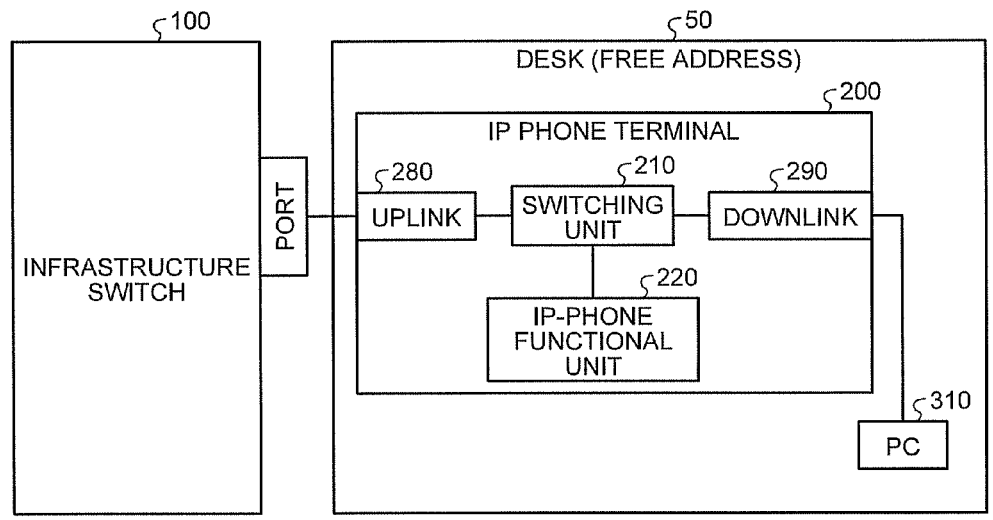
FIG. 3 is a diagram of another example of connection conditions of IP phones for office use.

FIGS. 2 and 3 are examples of connection conditions of IP phones for office use. In FIG. 2, the phone-terminal switching apparatuses 200a to 200c are connected to ports of the infrastructure switch 100, respectively. The phone-terminal switching apparatuses 200a to 200c are also connected to the terminals 310a to 310c, respectively.

The infrastructure switch 100 has the plural ports. The phone-terminal switching apparatuses 200a to 200c have switching units 210a to 210c and IP-phone functional units 220a to 220c, respectively. The switching units 210a to 210c each realize a switching function. The IP-phone functional units 220a to 220c each realize an IP phone function.

FIG. 3 is a schematic diagram for explaining a connection condition of an IP phone on a desk of a user. In the connection condition shown in FIG. 3, a phone-terminal switching apparatus 200 located on a desk 50 is connected to the port of the infrastructure switch 100. A terminal 310 as the PC is connected to the phone-terminal switching apparatus 200.

The phone-terminal switching apparatus 200 includes a switching unit 210, an IP-phone functional unit 220, an uplink unit 280, and a downlink unit 290. The switching unit 210 relays data transmission or reception between the terminal 310, the infrastructure switch 100, and IP-phone functional unit 220. The uplink unit 280 transmits or receives data to/from the port of the infrastructure switch 100. The downlink unit 290 is connected to the terminal 310. The IP-phone functional unit 220 realizes the IP phone function.

Recently, the IP phones become increasingly popular. The IP phones are realized by distributing IP phone-terminals to users or desks of the users and operating an IP exchange through an enterprise network. The IP phone-terminals are cabled through the Ethernet or the like, and the phone function is realized by controlling calls or transmitting media in an IP network using a Session Initiation Protocol or the like.

To start using the IP phone-terminal, the user needs to register an SIP address in the IP phone-terminal. The user inputs a user ID or a password to the IP phone-terminal. Accordingly, the SIP address of the user and an SIP address of the IP phone-terminal are associated with each other. The registration of the SIP address is required to correctly receive an incoming call to the user. The SIP address registration is also required to correctly identify a caller. The SIP address registration is also required to perform setting of an extensible function, for example, abbreviated dialing of the IP phone-terminal of each user.

IP-phone-terminal products for office use usually incorporate a switching component including an uplink and a downlink to facilitate cabling around desks. The uplink of the IP-phone-terminal product is connected to upstream of the enterprise network, and a typical PC or the like is connected to the downlink of the IP-phone-terminal product. In this connection condition, one port of the enterprise network is allocated to a desk of one user, so that an IP phone-terminal and a PC, which are necessary for the user, can be both used.

Figure 4:
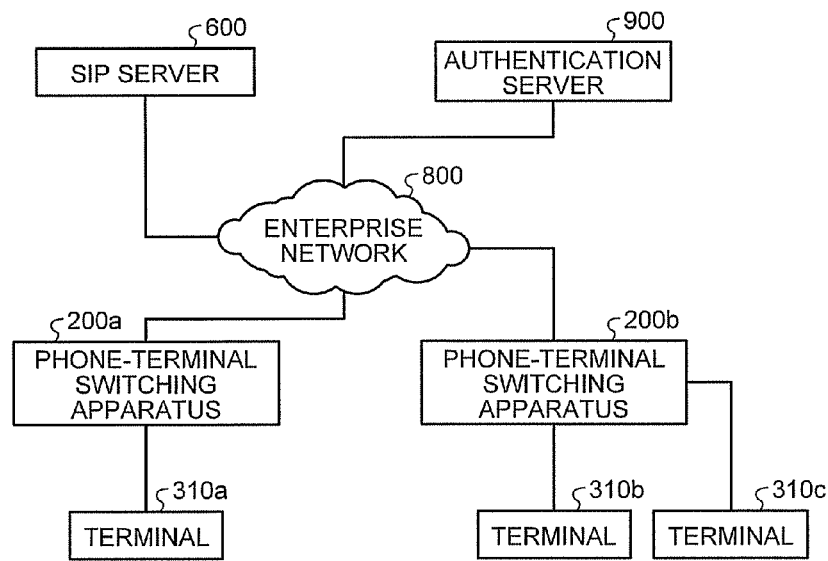
FIG. 4 is a diagram of an example of a network configuration according to an embodiment of the present invention.

FIG. 4 is a schematic diagram for explaining a network configuration according to the present embodiment. The network shown in FIG. 4 includes an SIP server 600, an authentication server 900, and the phone-terminal switching apparatuses 200a and 200b connected via an enterprise network 800. The terminal 310a is connected to the phone-terminal switching apparatus 200a, and the terminals 310b and 310c are connected to the phone-terminal switching apparatus 200b.

The enterprise network 800 is a core network device group operated as part of a network infrastructure of the office, for example. Each of the phone-terminal switching apparatuses 200a and 200b is a switch installed on a desk of each user and compliant with the IEEE802.1X Authenticator. The phone-terminal switching apparatuses 200a and 200b each have an input/output unit similar to that of a telephone set. The input/output unit receives input of user identification information such as a user name and a password of the user. The phone-terminal switching apparatus 200 communicates with the SIP server 600 via the enterprise network 800 using the user identification information, to authenticate the user.

The SIP server 600 communicates with the phone-terminal switching apparatuses 200a and 200b via the enterprise network 800 to authenticate users that use the phone-terminal switching apparatuses 200a and 200b. The SIP server 600 also can exchange authentication data with the authentication server 900 via the enterprise network 800 to refer to the practical authentication data. Upon completion of the authentication of the user, the SIP server 600 newly generates SS information, and notifies the phone-terminal switching apparatus 200a of the SS information and 802.1X setting information. The SIP server 600 also notifies the authentication server 900 of the SS information.

The terminals 310a to 310c are compliant with the IEEE802.1X Supplicant. Specific examples of the terminals 310a to 310c are a PC and a portable digital assistant (PDA). In some cases, one users use a plurality of terminals. The terminals 310a to 310c are connected to the enterprise network 800 through the phone-terminal switching apparatus 200a or 200b. For connection, the IEEE802.1X protocol is implemented between three parties of one of the terminals 310a to 310c, the phone-terminal switching apparatus 200a or 200b, and the authentication server 900.

The authentication server 900 is compliant with the IEEE802.1X Authentication Server. The authentication server 900 is connected to the phone-terminal switching apparatus 200a or 200b, the SIP server 600, and the like via the enterprise network 800.

Configurations of the phone-terminal switching apparatus 200, the authentication server 900, and the SIP server 600 are explained below in detail with reference to FIGS. 5 to 7.

Figure 5:
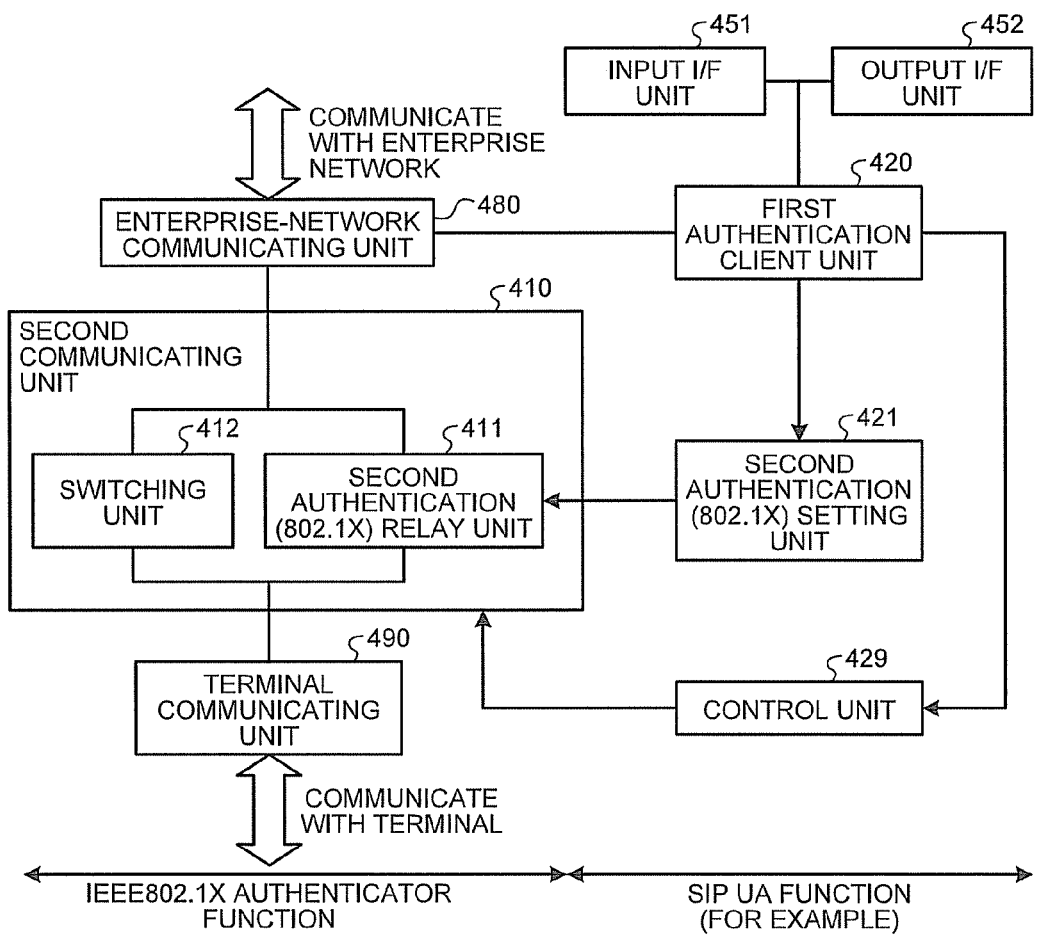
FIG. 5 is a block diagram of an example of a functional configuration of a phone-terminal switching apparatus.

FIG. 5 is a schematic diagram for explaining a functional configuration of the phone-terminal switching apparatus 200. The phone-terminal switching apparatus 200 includes a first authentication client unit 420, a second communicating unit 410, a second authentication setting unit 421, a control unit 429, a terminal communicating unit 490, an enterprise-network communicating unit 480, an input interface unit (hereinafter, "input I/F unit") 451, and an output interface unit (hereinafter, "output I/F unit") 452.

The first authentication client unit 420 provides a client function of authenticating a user that uses the phone-terminal switching apparatus 200 using the SIP. The first authentication client unit 420 establishes a communication with the SIP server 600 via the enterprise network 800 using the enterprise-network communicating unit 480. Accordingly, a user authenticating process is performed.

The input I/F unit 451 is used by the user to input the user name or the password to the phone-terminal switching apparatus 200. The input I/F unit 451 can be a numerical keypad, a keyboard, or an audio input I/F such as a microphone.

The output I/F unit 452 is used to confirm the user name or the password inputted by the user to the phone-terminal switching apparatus 200. The output I/F unit 452 is also used to confirm a result of authentication. The output I/F unit 452 is a display such as a liquid crystal display (LCD), a speaker, or the like.

The phone-terminal switching apparatus 200 performs user authentication through the first authentication client unit 420, the input I/F unit 451, and the output I/F unit 452. These components are often held in the IP phone-terminal.

The second authentication setting unit 421 performs IEEE802.1X setting to a second authentication relay unit 411 when the user is successfully authenticated. The control unit 429 controls a switching unit 412 and the second authentication relay unit 411 according to conditions of the user authentication. More specifically, the control unit 429 determines enabling or disabling of functions of the switching unit 412 and the second authentication relay unit 411.

The second communicating unit 410 includes the second authentication relay unit 411 and the switching unit 412. The second authentication relay unit 411 provides an IEEE802.1X Authenticator function. The second authentication relay unit 411 directly communicates with the terminal 310 by the terminal communicating unit 490 using an Extensible Authentication Protocol over LAN (EAPoL protocol). The second authentication relay unit 411 also communicates with the authentication server 900 by the enterprise-network communicating unit 480 via the enterprise network 800 using the RADIUS protocol as the AAA protocol. Accordingly, IEEE802.1X authentication is performed.

The switching unit 412 provides a function of switching a normal IP packet between physical ports. The switching unit 412 implements the switching function for the terminal 310. The switching unit 412 is controlled to provide the switching function only to terminals authenticated by IEEE802.1X.

The terminal communicating unit 490 controls the downlink which is a physical port connected to the terminal 310. The enterprise-network communicating unit 480 controls the uplink which is a physical port connected to the enterprise network 800.

The phone-terminal switching apparatus 200 provides a normal switching function compliant with the Authenticator by the terminal communicating unit 490, the enterprise-network communicating unit 480, the switching unit 412, and the second authentication relay unit 411.

Figure 6:
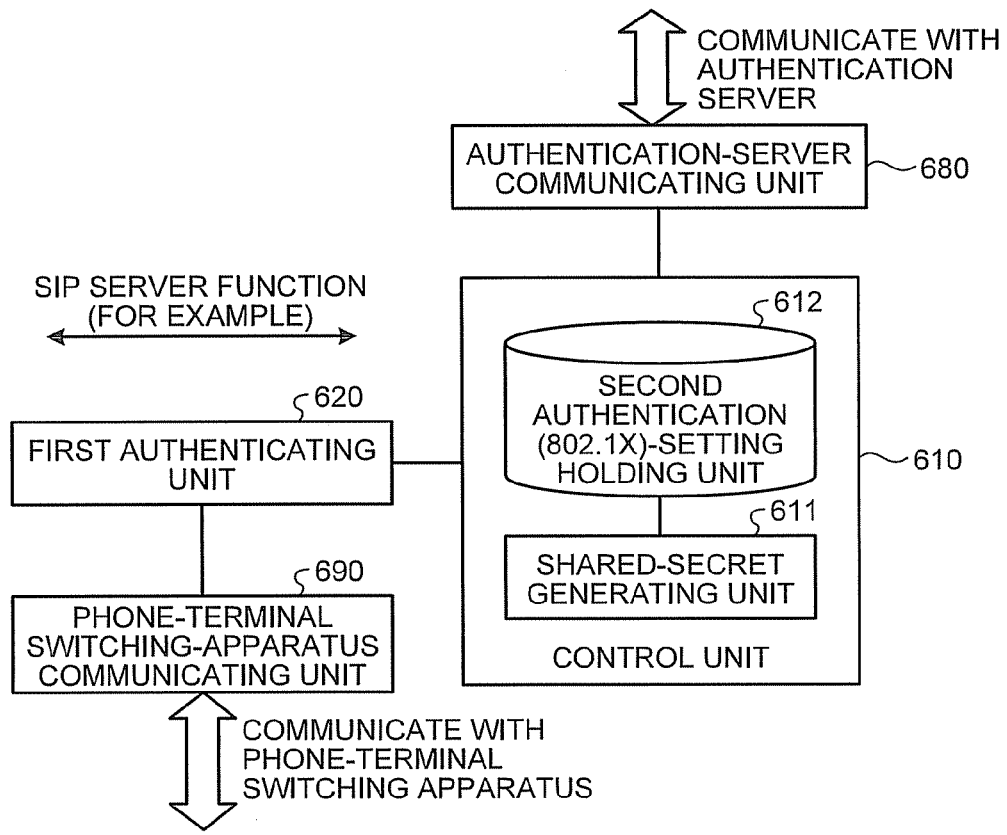
FIG. 6 is a block diagram of an example of a functional configuration of an SIP server.

FIG. 6 is a schematic diagram for explaining a functional configuration of the SIP server 600. The SIP server 600 includes a control unit 610, a first authenticating unit 620, an authentication-server communicating unit 680, and a phone-terminal switching apparatus communicating unit 690.

The first authenticating unit 620 authenticates a user of the phone-terminal switching apparatus 200 via the phone-terminal switching apparatus communicating unit 690. This user authentication is an authenticating process performed between the first authenticating unit 620 and the first authentication client unit 420 of the phone-terminal switching apparatus 200.

The phone-terminal switching apparatus communicating unit 690 controls an interface for communicating with the phone-terminal switching apparatus 200 via the enterprise network 800.

The first authenticating unit 620 and the phone-terminal switching apparatus communicating unit 690 are used in the SIP server 600 to authenticate a user of an SIP-compliant device. These components are held in a normal SIP server. In the present embodiment, the phone-terminal switching apparatus 200 is an SIP-compliant device.

When a first authenticating process is successfully performed, the control unit 610 performs setting to the phone-terminal switching apparatus 200 and the authentication server 900, required for the phone-terminal switching apparatus 200 that has succeeded in the authentication to operate as a switch compliant with the IEEE802.1X Authenticator.

The control unit 610 includes a second authentication-setting holding unit 612 and a Shared-Secret generating unit 611. The second authentication-setting holding unit 612 holds setting information required to implement an IEEE802.1X Authenticator function. The Shared-Secret generating unit 611 dynamically generates the SS information to be set in the phone-terminal switching apparatus 200 each time authentication of each phone-terminal switching apparatus 200 is successfully performed.

More specifically, the control unit 610 notifies the phone-terminal switching apparatus 200 of the IEEE802.1X setting information and the Shared Secret dynamically generated, through the phone-terminal switching apparatus communicating unit 690. The control unit 610 also notifies the authentication server 900 of the Shared Secret dynamically generated, through the authentication-server communicating unit 680.

The phone-terminal switching apparatus communicating unit 690 controls an interface for communicating with the phone-terminal switching apparatus 200 via the enterprise network 800.

The authentication-server communicating unit 680 controls an interface for communicating with the authentication server 900 via the enterprise network 800. The physical interface of the authentication-server communicating unit 680 can be the same as that of the phone-terminal switching apparatus communicating unit 690.

Figure 7:
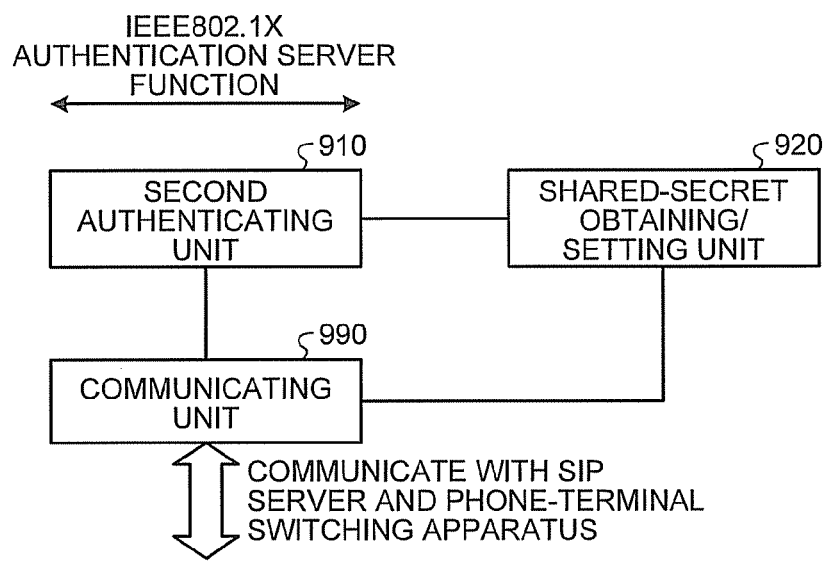
FIG. 7 is a block diagram of an example of a functional configuration of an authentication server.

FIG. 7 is a schematic diagram for explaining an example of a functional configuration of the authentication server 900. The authentication server 900 includes a second authenticating unit 910, a Shared-Secret obtaining/setting unit 920, and a communicating unit 990.

The second authenticating unit 910 implements an IEEE802.1X Authentication Server function. The second authenticating unit 910 exchanges the AAA protocol (RADIUS protocol) with the phone-terminal switching apparatus 200 as the Authenticator using the communicating unit 990 via the enterprise network 800.

The Shared-Secret obtaining/setting unit 920 receives the Shared Secret information required for secure communications with the phone-terminal switching apparatus 200 as the Authenticator from the SIP server 600 using the communicating unit 990 via the enterprise network 800. The Shared-Secret obtaining/setting unit 920 receives the Shared Secret, and sets the received Shared Secret in the second authenticating unit 910. Accordingly, communications with the phone-terminal switching apparatus 200 as a target Authenticator can be performed.

The communicating unit 990 controls an interface for communicating with the SIP server 600 and the phone-terminal switching apparatus 200.

Figure 8:
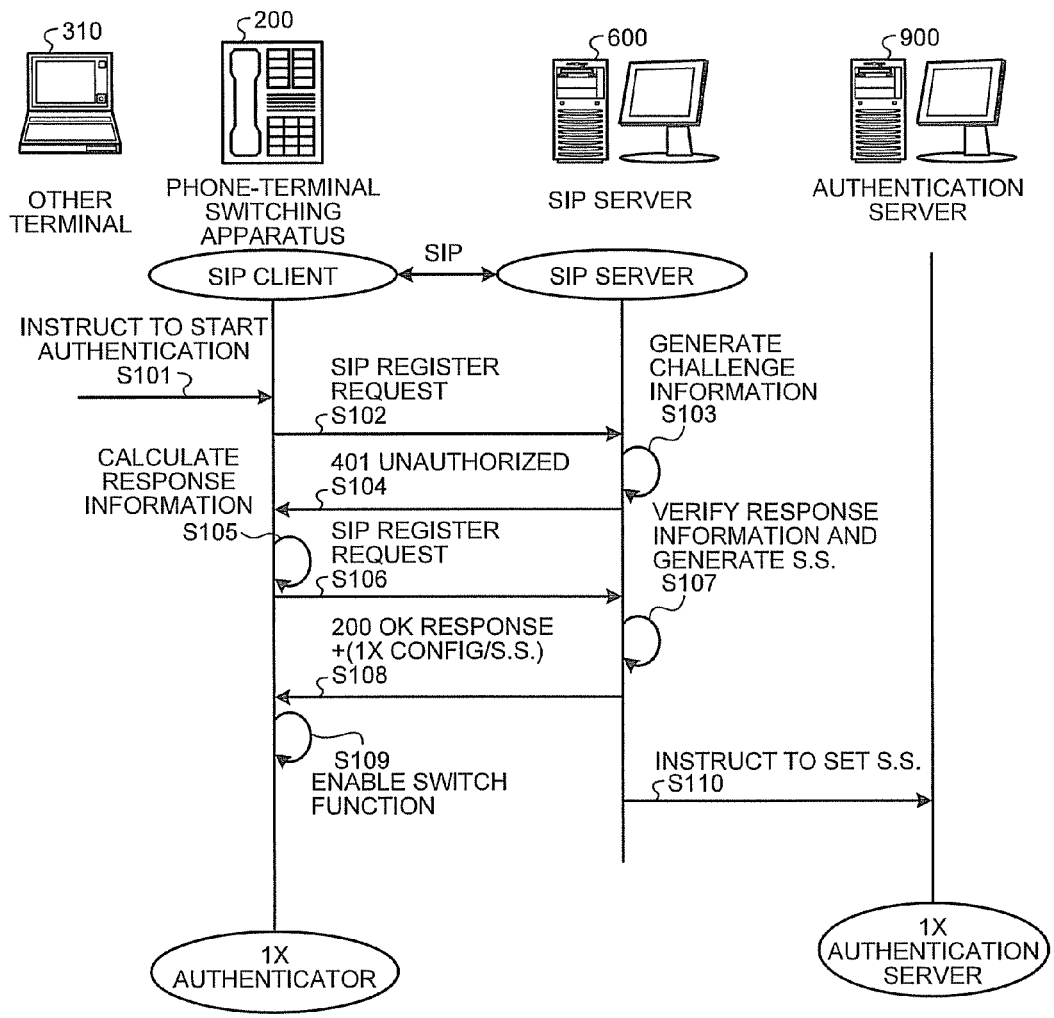
FIG. 8 is a sequence diagram for explaining an example of a first authentication.
Figure 11:
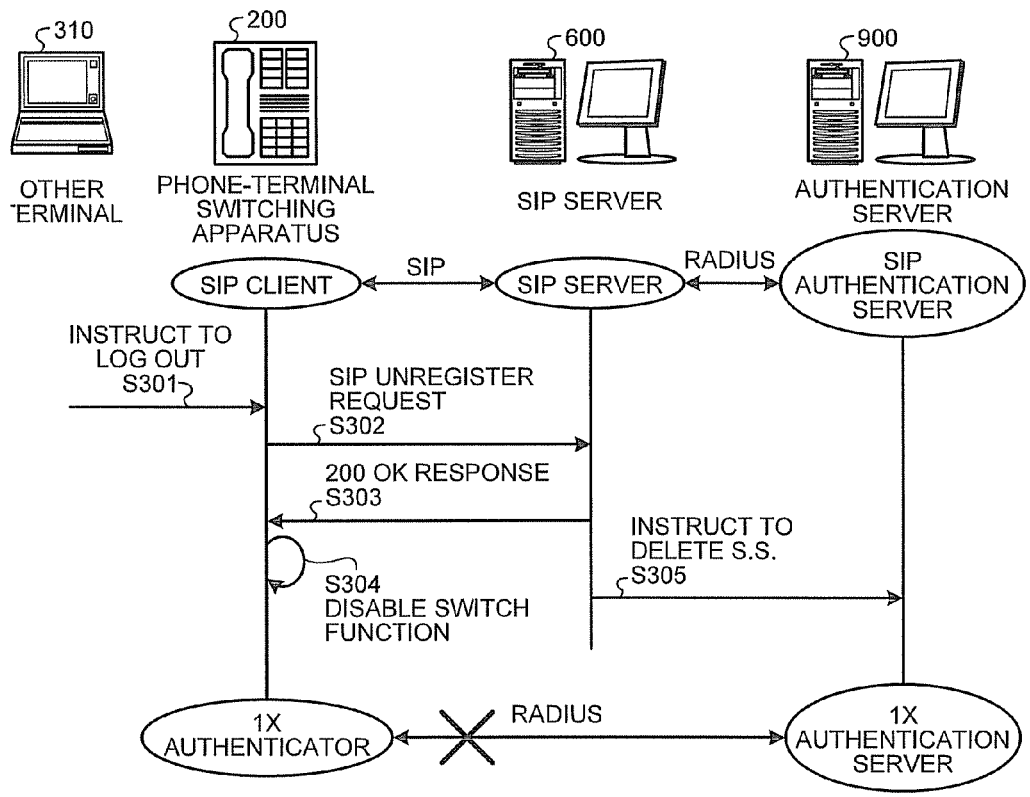
FIG. 11 is a sequence diagram of processing for terminating the first authentication.

FIGS. 8, 10, and 11 are flowcharts of an authenticating process by an authentication method according to the present embodiment, and FIG. 9 is a schematic diagram for explaining an example of messages exchanged in the authenticating process. The authentication method according to the present embodiment include following two authentication sequences. The first authentication is user authentication performed between the phone-terminal switching apparatus 200 and the SIP server 600. The second authentication is IEEE802.1X authentication performed among three parties of the terminal 310, the phone-terminal switching apparatus 200, and the authentication server 900.

Followings are prerequisites and restrictions related to the two authentication sequences, for example.
1. The phone-terminal switching apparatus 200 is installed on a desk of a user.
2. The phone-terminal switching apparatus 200 is used after the user performs user authentication, that is, after the user logs in and performs the first authentication.
3. When using the terminal 310, the user connects to the enterprise network 800 by the phone-terminal switching apparatus 200 through the terminal 310.
4. To use the terminal 310 by being connected to the enterprise network 800, the IEEE802.1X authentication, that is, the second authentication in the present embodiment is performed and only the terminal 310 authenticated is allowed to connect.
5. The phone-terminal switching apparatus 200 operates as a switch compliant with the IEEE802.1X Authenticator only while the first authentication as the user authentication is successful, and then performs the IEEE802.1X authentication as the second authentication.
6. When the terminal 310 is to be connected through the phone-terminal switching apparatus 200 that has not performed the first authentication as the user authentication, that is, when the second authentication as the IEEE802.1X authentication is to be performed, the connection and the authentication cannot be performed. This is because the function of the switch compliant with the IEEE802.1X Authenticator of the phone-terminal switching apparatus 200 is disabled.
7. When a time period of the first authentication as the user authentication ends due to log-out of the phone-terminal switching apparatus 200 by the user, or the like, the phone-terminal switching apparatus 200 disables the function of the switch compliant with the IEEE802.1X Authenticator. Therefore, the terminal 310 that is connected after performing the second authentication as the IEEE802.1X authentication through the phone-terminal switching apparatus 200 loses the connection to the enterprise network 800.

FIG. 8 is a sequence diagram for explaining an example of the first authentication as the user authentication performed between the phone-terminal switching apparatus 200 and the SIP server 600. In the sequence shown in FIG. 8, the phone-terminal switching apparatus 200, the SIP server 600, and the authentication server 900 exchange messages.

The user authentication performed in the sequence shown in FIG. 8 is digest authentication using the SIP protocol, for example. The phone-terminal switching apparatus 200 is an SIP client, and the SIP server 600 is an SIP server. The SIP server 600 previously holds a user name and a password of a user, required for the user authentication.

At Step S101 in FIG. 8, the user instructs to start the user authentication using the phone-terminal switching apparatus 200. Specifically, the user inputs the user name and the password assigned to the user to the phone-terminal switching apparatus 200 using the input I/F unit 451 of the phone-terminal switching apparatus 200. The user can confirm the inputted data using the output I/F unit 452.

At Step S102, a request for SIP address registration is transmitted from the first authentication client unit 420 of the phone-terminal switching apparatus 200 to the SIP server 600 through the enterprise-network communicating unit 480 based on the user name inputted at Step S101. The request for SIP address registration is "SIP Register Request". In the SIP server 600, the first authenticating unit 620 receives the request for SIP address registration from the user through the phone-terminal switching apparatus communicating unit 690.

At Step S103, the first authenticating unit 620 of the SIP server 600 generates challenge information for the digest authentication by using a random number.

At Step S104, the first authenticating unit 620 of the SIP server 600 transmits a response including the challenge information generated at Step S103 to the phone-terminal switching apparatus 200. The response transmitted here is "401 Unauthorized". In the phone-terminal switching apparatus 200, the first authentication client unit 420 receives the response including the challenge information generated in the SIP server 600 through the enterprise-network communicating unit 480.

At Step S105, the first authentication client unit 420 of the phone-terminal switching apparatus 200 calculates response information from the challenge information using the password inputted by the user.

At Step S106, the first authentication client unit 420 transmits a request for SIP address registration including the resultant response information to the SIP server 600 through the enterprise-network communicating unit 480. The request for SIP address registration transmitted here is "SIP Register Request". In the SIP server 600, the first authenticating unit 620 receives the request for SIP address registration through the phone-terminal switching apparatus communicating unit 690.

At Step S107, the first authenticating unit 620 of the SIP server 600 calculates response information. The response information is calculated from the password of the user corresponding to the request transmitted at Step S106 and stored in the SIP server 600, and the challenge information transmitted from the SIP server 600 to the phone-terminal switching apparatus 200, in the same manner as in the phone-terminal switching apparatus 200.

The first authenticating unit 620 compares the response information calculated by the first authenticating unit 620 itself and the response information included in the request for SIP address registration received from the phone-terminal switching apparatus 200 with each other. When these two pieces of the response information are the same, the first authenticating unit 620 regards the authentication as successful. When the authentication is successful, the first authenticating unit 620 considers the request as a proper user authentication request, and performs an SIP-address registering process.

Also at Step S107, the Shared-Secret generating unit 611 of the control unit 610 generates the SS information to be set in the phone-terminal switching apparatus 200 that has succeeded in the user authentication. The generation of the SS information is performed by using a random number, the user name used during the user authentication, identification information of the phone-terminal switching apparatus 200, and the like. The SS information needs to assuredly have a different value with respect to each user and each phone-terminal switching apparatus, and further a different value needs to be generated with respect to each authentication.

Also at Step S107, the control unit 610 notifies the first authenticating unit 620 of the setting information for the IEEE802.1X Authenticator described above and the SS information. The first authenticating unit 620 obtains the setting information for the IEEE802.1X Authenticator from the control unit 610 to be set in the phone-terminal switching apparatus 200 that has succeeded in the user authentication.

At Step S108, the first authenticating unit 620 of the SIP server 600 transmits to the phone-terminal switching apparatus 200, a successful response notifying of the successful user authentication and the completed SIP address registration through the phone-terminal switching apparatus communicating unit 690. The successful response is "200 OK".

In the phone-terminal switching apparatus 200, the first authentication client unit 420 receives the successful response generated in the SIP server 600 through the enterprise-network communicating unit 480. The first authentication client unit 420 obtains the setting information for the IEEE802.1X Authenticator and the SS information included in the successful response. If required, the first authentication client unit 420 can decode the information included in the successful response to obtain the setting information for the IEEE802.1X Authenticator and the SS information.

FIG. 9 is an example of a successful response message. The successful response shown in FIG. 9 includes the setting information for the IEEE802.1X Authenticator and the SS information. In FIG. 9, the setting information "a" for the IEEE802.1X Authenticator includes following information.
(1) An IP address and a port of a primary authentication server
(2) An IP address and a port of a secondary authentication server
(3) On/Off of an accounting function
(4) Setting of authentication expiration
(5) Setting of Termination-Action (for example, enabling/disabling, time-out time, and the number of confirmations)
(6) SS information For the SS information, any one of following measures (A) and (B) is taken to prevent the information from leaking to other devices.
(A) Without transmitting the SS information as it is, the SS information encrypted using password information of the corresponding user, random number information separately generated, and the like is transmitted.
(B) SIP messages exchanged between the phone-terminal switching apparatus 200 and the SIP server 600 are all encrypted according to Transport Layer Security (TLS), Security Architecture for Internet Protocol (IPsec), or the like.

At Step S109, the second authentication setting unit 421 sets the information obtained at Step S108 in the second authentication relay unit 411. Also at Step S109, the control unit 429 enables the functions of the second authentication relay unit 411 and the switching unit 412. The process at Step S109 enables the IEEE802.1X Authenticator function of the phone-terminal switching apparatus 200.

At the time of Step S109, the user authentication using the SIP has been completed. Therefore, the phone-terminal switching apparatus 200 can provide an SIP service (for example, phone service).

At Step S110, an ID of the phone-terminal switching apparatus 200 that has succeeded in the user authentication and the SS information transmitted to the phone-terminal switching apparatus 200 are notified the authentication server 900 from the control unit 610 of the SIP server 600 through the authentication-server communicating unit 680. The ID of the phone-terminal switching apparatus 200 is an IP address, for example. The processes at Steps S108 and S109 and the process at Step S110 can be performed asynchronously.

When the information is transmitted from the SIP server 600 to the authentication server 900, leakage of the SS information needs to be avoided. For this purpose, the Shared Secret can be encrypted using secret information previously shared between the SIP server 600 and the authentication server 900. Alternatively, all data can be encrypted using a security protocol such as the TLS and the IPsec to exchange messages.

After the process at Step S110, the Shared-Secret obtaining/setting unit 920 of the authentication server 900 receives through the communicating unit 990, the ID of the phone-terminal switching apparatus 200 that has succeeded in the user authentication and the SS information transmitted to the phone-terminal switching apparatus 200, which are transmitted from the SIP server 600. The Shared-Secret obtaining/setting unit 920 performs setting of the second authenticating unit 910 using the received information.

The processes shown in FIG. 8 enable the authentication server 900 as the IEEE802.1X Authentication Server to communicate with the phone-terminal switching apparatus 200 as the IEEE802.1X Authenticator, which makes possible to perform the IEEE802.1X authentication.

FIG. 10 is a sequence diagram of an example of processing of the second authentication as the IEEE802.1X authentication which is performed among the three parties of the terminal 310, the phone-terminal switching apparatus 200, and the authentication server 900. In the sequence shown in FIG. 10, transmission or reception of data is performed among the terminal 310, the phone-terminal switching apparatus 200, and the authentication server 900. Authentication of the terminal 310 to be performed in the sequence shown in FIG. 10 is authentication using IEEE802.1X, for example. The terminal 310 corresponds to the IEEE802.1X Supplicant, the phone-terminal switching apparatus 200 corresponds to the IEEE802.1X Authenticator, and the authentication server 900 corresponds to the IEEE802.1X Authentication Server.

As a result of the first authentication described with reference to FIGS. 8 and 9, the setting for the phone-terminal switching apparatus 200 as the IEEE802.1X Authenticator, and the Shared Secret setting for the authentication server 900 as the IEEE802.1X Authentication Server to communicate with the phone-terminal switching apparatus 200 are completed.

In the processing shown in FIG. 10, authentication information required for the IEEE802.1X authentication of the terminal 310 is previously registered in the authentication server 900. The sequence shown in FIG. 10 is the same as a sequence of an authentication protocol standardized as IEEE802.1X, and thus only its outline will be explained.

At Step S201 in FIG. 10, the user of the terminal 310 inputs information required for start of the IEEE802.1X authentication into the terminal 310. The inputted information varies according to an authentication algorithm set as IEEE802.1X, and is a user name and a password, for example.

At Step S202, the terminal 310 transmits information required for the authentication to the phone-terminal switching apparatus 200 using the EAPoL protocol. In the phone-terminal switching apparatus 200, the second authentication relay unit 411 processes EAPoL data received from the terminal 310 through the terminal communicating unit 490 to convert the EAPoL data into the corresponding RADIUS protocol.

At Step S203, the phone-terminal switching apparatus 200 transmits the information that is required for the authentication and converted into the RADIUS protocol to the authentication server 900 through the enterprise-network communicating unit 480. At this time, the setting information for the IEEE802.1X Authenticator and the SS information, obtained and set in the first authentication sequence shown in FIG. 8 is used.

In the authentication server 900, the second authenticating unit 910 receives the RADIUS protocol from the phone-terminal switching apparatus 200 through the communicating unit 990. At this time, the SS information obtained and set in the first authentication sequence shown in FIG. 8 is used.

At Step S204, the second authenticating unit 910 of the authentication server 900 transmits the RADIUS protocol to the phone-terminal switching apparatus 200 through the communicating unit 990. At this time, the SS information obtained and set in the first authentication sequence shown in FIG. 8 is used.

The phone-terminal switching apparatus 200 receives the RADIUS protocol data from the authentication server 900 through the enterprise-network communicating unit 480. At this time, the setting information for the IEEE802.1X Authenticator and the SS information, obtained and set in the first authentication sequence is used.

At Step S205, the second authentication relay unit 411 processes the RADIUS protocol data received at Step S204 to convert the RADIUS protocol into the corresponding EAPoL protocol.

At Step S206, the second authentication relay unit 411 transmits the EAPoL protocol data obtained at Step S205 to the terminal 310 through the terminal communicating unit 490.

At Step S207, when the IEEE802.1X protocol is not completed, the processing returns to Step S202 to repeatedly perform the above processes.

At Step S208, the authentication server 900 transmits the RADIUS protocol to the phone-terminal switching apparatus 200 after the authentication is successfully performed. The RADIUS protocol transmitted here is "RADIUS ACCEPT".

At Step S209, the second authentication relay unit 411 of the phone-terminal switching apparatus 200 determines that the authentication of the corresponding terminal 310 is successfully performed based on "RADIUS ACCEPT" received at Step S208. The second authentication relay unit 411 changes the setting in the switching unit 412 to enable the corresponding terminal 310 to communicate with the enterprise-network communicating unit 480 through the terminal communicating unit 490 and the switching unit 412.

At Step S210, the second authentication relay unit 411 transmits the EAPoL data to the terminal 310. The EAPoL data transmitted here is "EAP-Success". When receiving "EAP-Success", the terminal 310 recognizes a success of the authentication. The processes at Steps S209 and S210 can be performed asynchronously.

According to the sequence shown in FIG. 10, the IEEE802.1X authentication of the terminal 310 connected to the phone-terminal switching apparatus 200 is completed. This enables the terminal 310 to communicate with the enterprise network 800 via the phone-terminal switching apparatus 200.

FIG. 11 is a sequence diagram of processing for terminating the first authentication as the user authentication between the phone-terminal switching apparatus 200 and the SIP server 600. In the sequence shown in FIG. 11, transmission or reception of data is performed among the phone-terminal switching apparatus 200, the SIP server 600, and the authentication server 900.

At Step S301 in FIG. 11, the user instructs the phone-terminal switching apparatus 200 to terminate the user authentication, that is, to log out. Specifically, the user inputs a log-out request for the first authentication client unit 420 through the input I/F unit 451 of the phone-terminal switching apparatus 200.

At Step S302, the first authentication client unit 420 of the phone-terminal switching apparatus 200 transmits a request for termination of the SIP address registration to the SIP server 600 through the enterprise-network communicating unit 480 based on the instruction inputted at Step S301 by the user. The request for termination of the SIP address registration transmitted here is "SIP Unregister Request". The first authenticating unit 620 of the SIP server 600 performs an address-registration terminating process based on the request for termination of the SIP address registration from the user.

At Step S303, the first authenticating unit 620 of the SIP server 600 transmits a successful response to the phone-terminal switching apparatus 200 through the phone-terminal switching apparatus communicating unit 690. The successful response transmitted here is "200 OK Response". In the phone-terminal switching apparatus 200, the first authentication client unit 420 receives the successful response from the SIP server 600 through the enterprise-network communicating unit 480.

At Step S304, the control unit 429 of the phone-terminal switching apparatus 200 disables the functions of the second authentication relay unit 411 and the switching unit 412. Also at Step S304, the second authentication setting unit 421 deletes the setting of the SS information held in the second authentication relay unit 411.

According to the processes up to Step S304, the phone-terminal switching apparatus 200 terminates the operations of the IEEE802.1X Authenticator and the switching apparatus.

At Step S305, the control unit 610 of the SIP server 600 notifies the authentication server 900 of the terminated user authentication of the phone-terminal switching apparatus 200 and the ID of the phone-terminal switching apparatus 200 the user authentication of which has been terminated, through the authentication-server communicating unit 680. The ID of the phone-terminal switching apparatus 200 is an IP address, for example. The process at Step S305 can be performed asynchronously with the process at Step S303 of notification from the first authenticating unit 620 of the SIP server 600 to the phone-terminal switching apparatus 200 that the SIP-address-registration terminating process is completed.

In the authentication server 900, the Shared-Secret obtaining/setting unit 920 recognizes the notification received from the SIP server 600. The Shared-Secret obtaining/setting unit 920 causes the second authenticating unit 910 to delete the SS information of the corresponding phone-terminal switching apparatus 200.

According to the processes shown in FIG. 11, the SS information is deleted from both of the phone-terminal switching apparatus 200 and the authentication server 900. When the SS information is deleted based on an instruction of log-out after termination of the communication based on the authentication, menaces of misuse of the SS information stolen from the phone-terminal switching apparatus 200 and the like can be reduced.

Figure 12:
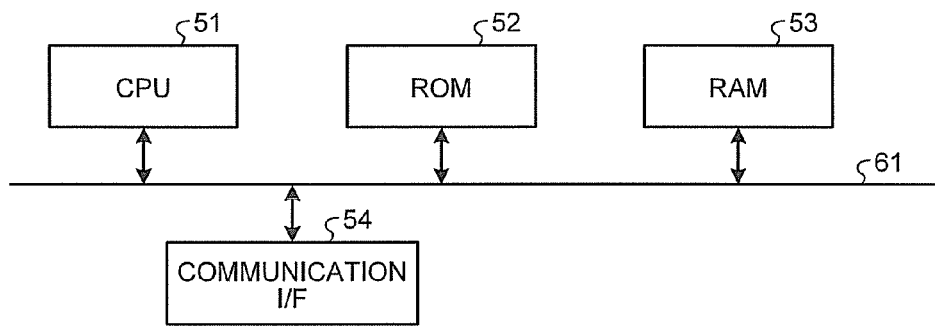
FIG. 12 is a diagram of a hardware configuration of an IP phone terminal.

A hardware configuration of the IP phone-terminal according to the present embodiment is explained below with reference to FIG. 12. FIG. 12 is a schematic diagram for explaining the hardware configuration of the IP phone-terminal according to the present embodiment.

The IP phone-terminal according to the present embodiment includes a control unit such as a central processing unit (CPU) 51, storages such as a read only memory (ROM) 52 and a random access memory (RAM) 53, a communication I/F 54 for connecting to a network to establish communications, and a bus 61 that connects these components.

A computer program executed in the IP phone-terminal according to the present embodiment is provided by being previously integrated in the ROM 52, or the like.

The computer program executed in the IP phone-terminal according to the present embodiment can be provide by being recorded in a computer-readable recording medium such as a compact disk read only memory (CD-ROM), a flexible disk (FD), a compact disk recordable (CD-R), and a digital versatile disk (DVD) in a file of an installable or executable form.

The computer program executed in the IP phone-terminal according to the present embodiment can be stored in a computer connected to a network such as the Internet and provided by being downloaded via the network. The computer program executed in the IP phone-terminal according to the present embodiment can be provided or distributed via a network such as the Internet.

The computer program executed in the IP phone-terminal according to the present embodiment has a module configuration including the components described above (the first authentication client unit 420, the second communicating unit 410, the second authentication setting unit 421, the control unit 429, and the like). As practical hardware, the CPU 51 reads the computer program from the ROM 52 and executes the program, so that these components are loaded into a main memory and generated in the main memory.

In the present embodiment, the digest authentication using the SIP has been explained as the first authentication that is the user authentication. However, the first authentication is not limited to the SIP. Another authentication method such as Protocol for carrying Authentication for Network Access (PANA) can be used.

In the present embodiment, the IEEE802.1X has been explained as the second authentication that is the connection authentication of the terminal 310. However, the second authentication is not limited to the IEEE802.1X. Another authentication method such as PANA can be used.

The present embodiment is based on the following premise. To connect the terminal 310 to the enterprise network 800 via the phone-terminal switching apparatus 200 that has not performed the user authentication, the IEEE802.1X authentication is tried to be performed. However, because the function of the switch compliant with the IEEE802.1X Authenticator is disabled in the phone-terminal switching apparatus 200, connection and authentication cannot be performed.

The phone-terminal switching apparatus 200 includes the output I/F unit 452. Therefore, when the user connects a terminal via the phone-terminal switching apparatus 200 that has not performed the user authentication, an image, a sound, or the like that urges the user to perform the user authentication can be outputted through the output I/F unit 452 serving as part of the phone-terminal function. It is desirable that the output I/F unit 452 be a display such as an LCD, a speaker, or the like.

The present embodiment is also based on the following premise. When the user logs out of the phone-terminal switching apparatus 200 to terminate the user authentication period, the phone-terminal switching apparatus 200 disables the function of the IEEE802.1X Authenticator-compliant switch. Therefore, the terminal 310 that has performed the IEEE802.1X authentication and been connected through the phone-terminal switching apparatus 200 loses connection to the enterprise network 800.

The phone-terminal switching apparatus 200 includes the output I/F unit 452. Therefore, when the user tries to terminate the user authentication during execution of a communication by the terminal 310, an image or a sound warning the user that "the communication of the terminal will fail if the user authentication is terminated because the terminal is in communication" can be outputted through the output I/F unit 452 serving as part of the phone-terminal function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A switching apparatus comprising:
a memory having computer executable components stored therein; and
a processor communicatively coupled to the memory, the processor configured to facilitate execution of the computer executable components, the computer executable components, comprising:
an authentication client unit that requests user authentication to a user authentication server that performs user authentication of the switching apparatus, and, in response to the user authentication being successfully performed, receives from the user authentication server, success information indicating success of the user authentication, wherein the success information comprises setting information used when terminal authentication of a terminal to be connected to the switching apparatus is relayed to a terminal authentication server that performs terminal authentication, and shared secret information, the shared secret information being generated in the user authentication server each time the requested user authentication is successfully performed and being information for secure communication between the terminal and the terminal authentication server;
an authentication setting unit that sets the setting information and the shared secret information to an authentication relay unit in response to receipt of the success information by the authentication client unit, wherein the authentication relay unit relays a terminal authentication; and
a control unit that allows the authentication relay unit to relay the terminal authentication when the setting information and the shared secret information is set to the authentication relay unit.

2. The switching apparatus according to claim 1, further comprising the authentication relay unit that relays the terminal authentication of the terminal in response to the control unit allowing relay of the terminal authentication.

3. The switching apparatus according to claim 1, wherein the control unit further allows a switching unit that relays a communication of a terminal to be connected to the switching apparatus to relay a communication to a terminal that has succeeded in the terminal authentication.

4. The switching apparatus according to claim 3, wherein the control unit terminates the terminal authentication and causes the switching unit to terminate relay of the communication to the terminal, in response to termination of the user authentication being instructed during the communication of the terminal resulting from success of the user authentication and success of the terminal authentication.

5. The switching apparatus according to claim 1, further comprising an image generating unit that generates an image notifying of termination of the user authentication and termination of relay of a communication of the terminal, in response to termination of the user authentication being instructed during the communication of the terminal resulting from success of the user authentication and success of the terminal authentication.

6. The switching apparatus according to claim 1, further comprising an image generating unit that generates an image urging to perform the user authentication, in response to the user authentication being unsuccessful and the terminal authentication being requested.

7. The switching apparatus according to claim 1, wherein the user authentication is performed based on user identification information of the switching apparatus.

8. The switching apparatus according to claim 1, further comprising:
a telephone communicating unit that establishes telephone communications based on the user authentication;
an input interface unit for the telephone communications by the telephone communication unit; and
an output interface unit for the telephone communications by the telephone communicating unit.

9. The switching apparatus according to claim 1, wherein the user authentication is one of a Session Initiation Protocol (SIP) or a Protocol for carrying authentication for network Access (PANA).

10. The switching apparatus according to claim 1, wherein the terminal authentication is one of an IEEE (Institute of Electrical and Electronic Engineers) 802.1X or a Protocol for carrying Authentication for Network Access (PANA).

11. The switching apparatus according to claim 1, further comprising a deleting unit that deletes the shared secret information in response to completion of communication of the shared secret information the user authentication.

12. An authentication system comprising:
a switching apparatus; and
a user authentication server that performs user authentication of the switching apparatus and is connected the switching apparatus, wherein
the switching apparatus includes
a memory having computer executable components stored therein; and
a processor communicatively coupled to the memory, the processor configured to facilitate execution of the computer executable components, the computer executable components, comprising:
an authentication client unit that requests the user authentication server to perform user authentication, and, in response to the user authentication being successfully performed, receives from the user authentication server, success information of success of the user authentication, wherein the success information includes setting information used when terminal authentication of a terminal to be connected to the switching apparatus is relayed to a terminal authentication server that performs the terminal authentication, and shared secret information, the shared secret information being generated in the user authentication server each time the requested user authentication is successfully performed and being information for secure communication between the terminal and the terminal authentication server,
an authentication setting unit that sets the setting information and the shared secret information to an authentication relay unit in response to receipt of the success information by the authentication client unit, wherein the authentication relay unit relays the terminal authentication,
a control unit that allows the authentication relay unit to relay the terminal authentication when the setting information is set to the authentication relay unit, and
a processor for executing at least the authentication client unit, and
the user authentication server includes
an authenticating unit that receives a request for user authentication, and, in response to the request for user authentication being successfully performed, transmits to the switching apparatus the information of the success of the user authentication, the setting information, and the shared secret information, and
a control unit that requests the terminal authentication server to set the terminal authentication based on the shared secret information.

13. An authentication method performed in a switching apparatus, comprising:
requesting user authentication to a user authentication server that performs user authentication of the switching apparatus;
receiving, in response to the user authentication being successfully performed, from the user authentication server, success information of success of the user authentication, wherein the success information comprises setting information used when terminal authentication of a terminal to be connected to the switching apparatus is relayed to a terminal authentication server that performs terminal authentication, and shared secret information, the shared secret information being generated in the user authentication server each time the requested user authentication is successfully performed and being information for secure communication between the terminal and the terminal authentication server;
setting the setting information and the shared secret information to an authentication relay unit in response to the receiving the success information, wherein the authentication relay unit relays a terminal authentication; and
allowing the authentication relay unit to relay the terminal authentication when the setting information is set to the authentication relay unit.

14. An authentication method performed in an authentication system including a switching apparatus and a user authentication server that performs user authentication of the switching apparatus and is connected the switching apparatus, the method comprising:
requesting, by the switching apparatus, user authentication to a user authentication server that performs user authentication of the switching apparatus;
receiving by the switching apparatus, in response to the user authentication being successfully performed, from the user authentication server, success information of success of the user authentication, the success information including setting information used when terminal authentication of a terminal to be connected to the switching apparatus is relayed to a terminal authentication server that performs terminal authentication, and shared secret information, the shared secret information being generated in the user authentication server each time the requested user authentication is successfully performed and being information for secure communication between the terminal and the terminal authentication server;

setting by the switching apparatus, the setting information and the shared secret information to an authentication relay unit in response to the receiving the success information by the switching apparatus, wherein the authentication relay unit relays terminal authentication; and allowing the authentication relay unit to relay the terminal authentication by the switching apparatus when relay of the terminal authentication is set to the authentication relay unit;

receiving, a request for user authentication by the user authentication server;

transmitting, by the user authentication server, in response to the user authentication being successfully performed, the information of the success of the user authentication, setting information used when terminal authentication of a terminal to be connected to the switching apparatus is relayed to a terminal authentication server that performs terminal authentication, and the shared secret information to the switching apparatus, the shared secret information being generated each time the requested user authentication is successfully performed; and requesting by the user authentication server to the terminal authentication server to set the terminal authentication based on the shared secret information.

15. A computer program product having a non-transitory computer readable medium including programmed instructions for performing an authentication method executed in a switching apparatus, wherein the instructions, in response to execution, cause a computer to perform operation including:

requesting user authentication to a user authentication server that performs user authentication of the switching apparatus;

receiving, in response to the requested user authentication being successfully performed, from the user authentication server, success information of success of the user authentication, wherein the success information comprises setting information used when terminal authentication of a terminal to be connected to the switching apparatus is relayed to a terminal authentication server that performs terminal authentication, and shared secret information, the shared secret information being generated in the user authentication server each time the requested user authentication is successfully performed and being information for secure communication between the terminal and the terminal authentication server;

setting the setting information and the shared secret information to an authentication relay unit in response to the receiving the success information, wherein the authentication relay unit relays a terminal authentication; and allowing the authentication relay unit to relay the terminal authentication when the setting information is set to the authentication relay unit.

* * * * *